(12) United States Patent
Fujio

(10) Patent No.: US 12,145,891 B2
(45) Date of Patent: Nov. 19, 2024

(54) CERAMIC STRUCTURAL BODY

(71) Applicant: KYOCERA Corporation, Kyoto (JP)

(72) Inventor: Kazuhiko Fujio, Satsumasendai (JP)

(73) Assignee: KYOCERA Corporation, Kyoto (JP)

( * ) Notice: Subject to any disclaimer, the term of this patent is extended or adjusted under 35 U.S.C. 154(b) by 660 days.

(21) Appl. No.: 17/263,461

(22) PCT Filed: Aug. 28, 2019

(86) PCT No.: PCT/JP2019/033699
§ 371 (c)(1),
(2) Date: Jan. 26, 2021

(87) PCT Pub. No.: WO2020/045495
PCT Pub. Date: Mar. 5, 2020

(65) Prior Publication Data
US 2021/0292247 A1    Sep. 23, 2021

(30) Foreign Application Priority Data

Aug. 30, 2018    (JP) .................................. 2018-161681

(51) Int. Cl.
*C04B 37/00*     (2006.01)
*C04B 37/02*     (2006.01)

(52) U.S. Cl.
CPC .......... *C04B 37/028* (2013.01); *C04B 37/003* (2013.01); *C04B 37/008* (2013.01); *C04B 37/023* (2013.01); *C04B 2237/04* (2013.01); *C04B 2237/12* (2013.01); *C04B 2237/32* (2013.01); *C04B 2237/40* (2013.01); *C04B 2237/84* (2013.01); *Y10T 428/24339* (2015.01)

(58) Field of Classification Search
CPC .. C04B 37/00–047; C04B 2237/00–88; C04B 35/00–66; B32B 18/00; H01J 61/00–98; H01J 9/00–52
See application file for complete search history.

(56) References Cited

U.S. PATENT DOCUMENTS

| | | | |
|---|---|---|---|
| 4,780,646 A | * | 10/1988 | Lange .................... H01J 61/366 313/332 |
| 4,892,498 A | | 1/1990 | Gradl et al. |
| 5,539,611 A | | 7/1996 | Hegner et al. |
| 6,008,579 A | * | 12/1999 | Negi ........................ H01J 43/28 313/532 |
| 10,543,446 B2 | | 1/2020 | Kondo et al. |

(Continued)

FOREIGN PATENT DOCUMENTS

| | | |
|---|---|---|
| EP | 0982278 A1 | 3/2000 |
| EP | 1170770 A1 | 1/2002 |

(Continued)

OTHER PUBLICATIONS

Machine translation of JP 2016/108233A, obtained from EspaceNet.*
Machine translation of JP 2009/048868 A.*

*Primary Examiner* — Z. Jim Yang
(74) *Attorney, Agent, or Firm* — Procopio, Cory, Hargreaves & Savitch LLP

(57) ABSTRACT

A ceramic structural body includes a substrate that is composed of a ceramic(s), a hole that is opened on a surface of the substrate, and a seal material that is positioned at an opening portion of the hole.

4 Claims, 6 Drawing Sheets

(56) References Cited

U.S. PATENT DOCUMENTS

| | | | |
|---|---|---|---|
| 2002/0033671 A1* | 3/2002 | Niimi | H01J 61/366 313/623 |
| 2002/0153837 A1* | 10/2002 | Johnston | H01J 9/34 313/578 |
| 2004/0071945 A1* | 4/2004 | Ito | H01L 21/6831 428/209 |
| 2005/0045618 A1 | 3/2005 | Ito | |
| 2007/0242457 A1* | 10/2007 | Okanuma | H01J 61/0732 362/261 |
| 2009/0278435 A1* | 11/2009 | Sasai | H01J 61/34 313/317 |
| 2010/0194260 A1* | 8/2010 | Sekiguchi | H01K 1/46 313/318.01 |
| 2012/0106712 A1* | 5/2012 | Hunt | H01J 9/18 378/132 |
| 2012/0187829 A1* | 7/2012 | Utsubo | H01J 5/62 313/638 |
| 2015/0265396 A1* | 9/2015 | Ok | A61F 2/0095 623/6.63 |
| 2015/0307402 A1* | 10/2015 | Cai | C04B 35/634 428/34.4 |
| 2016/0155625 A1* | 6/2016 | Tagawa | H01J 61/0732 313/633 |
| 2018/0031934 A1* | 2/2018 | Watanabe | B32B 15/08 |
| 2019/0382880 A1* | 12/2019 | He | C23C 16/0281 |

FOREIGN PATENT DOCUMENTS

| | | | | |
|---|---|---|---|---|
| GB | 714976 A | | 9/1954 | |
| JP | 2001-058882 A | | 3/2001 | |
| JP | 2008-71843 A | | 3/2008 | |
| JP | 2009048868 A | * | 3/2009 | ......... H01J 61/0732 |
| JP | 2013-224253 A | | 10/2013 | |
| JP | 2014-131015 A | | 7/2014 | |
| JP | 2016-108233 A | | 6/2016 | |
| JP | 2018-114485 A | | 7/2018 | |

\* cited by examiner

CERAMIC STRUCTURAL BODY

CROSS-REFERENCE TO RELATED APPLICATION(S)

This application is a national stage application of International Application No. PCT/JP2019/033699 filed on Aug. 28, 2019, which designates the United States, the entire contents of which are herein incorporated by reference, and which is based upon and claims the benefit of priority to Japanese Patent Application No. 2018-161681 filed on Aug. 30, 2018, the entire contents of which are herein incorporated by reference.

FIELD

The present disclosure relates to a ceramic structural body.

BACKGROUND

A ceramic structural body has widely been used in various fields. For example, a ceramic structural body has an excellent rigidity and hence is used in a semiconductor manufacturing device where a microfabrication accuracy is needed or the like.

Herein, a step of degreasing a binder that is added to a raw material is needed in a step of manufacturing a ceramic structural body, however, a crack may be generated, or in some cases, breakage may be caused, in such a step of degreasing a binder.

Hence, it has been known that a net-like groove that is connected to an outside so as to discharge a binder to the outside efficiently is provided in an inside so as not to generate a crack in a step of degreasing a binder. A groove is thus provided so that it is possible to prevent or reduce a crack in a step of degreasing a binder, however, as a groove is opened on a surface of a ceramic structural body, a suspended particle (s) (a particle (s)) may be generated from an opening portion thereof.

In order to prevent or reduce such generation of a suspended particle (s) from an opening portion, Patent Literature 1 discloses that, in a case where a ceramic structural body is composed of silicon carbide, in sealing a site that is connected to an outside of a groove, a mixed powder of silicon carbide and silicon is prepared and a groove that is connected to an outside is filled with the mixed powder and is heat-treated under a vacuum atmosphere, so that the site that is connected to an outside of a groove is sealed.

CITATION LIST

Patent Literature

Patent Literature 1: Japanese Patent Application Publication No. 2014-131015

SUMMARY

A ceramic structural body according to the present disclosure includes a substrate that is composed of a ceramic(s), a hole that is opened on a surface of the substrate, and a seal material that is positioned at an opening portion of the hole.

DESCRIPTION OF EMBODIMENTS

Figure 1:
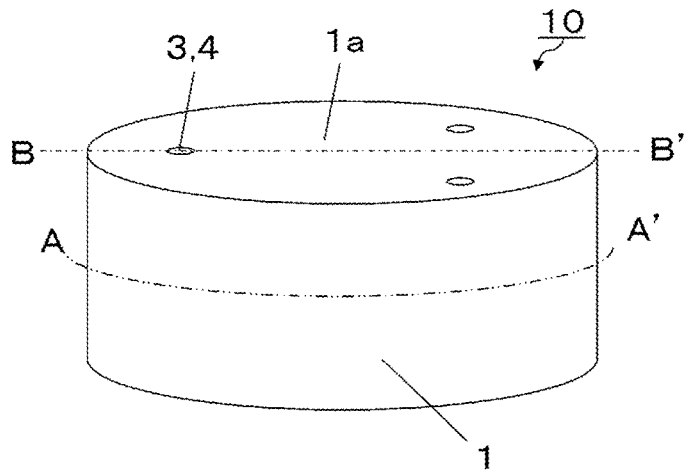
FIG. 1 is a perspective view that schematically illustrates an example of a ceramic structural body according to the present disclosure.

Hereinafter, a ceramic structural body according to the present disclosure will be explained in detail with reference to the drawing (s).

Figure 2:
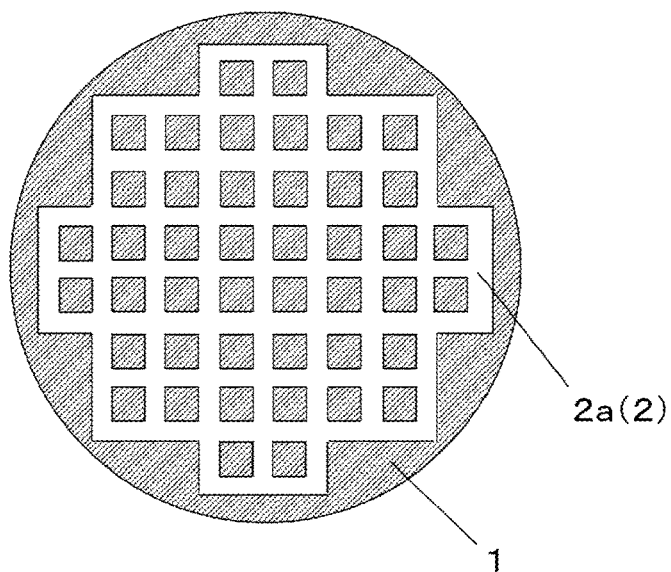
FIG. 2 is a cross-sectional view along line A-A' in FIG. 1.
Figure 3:
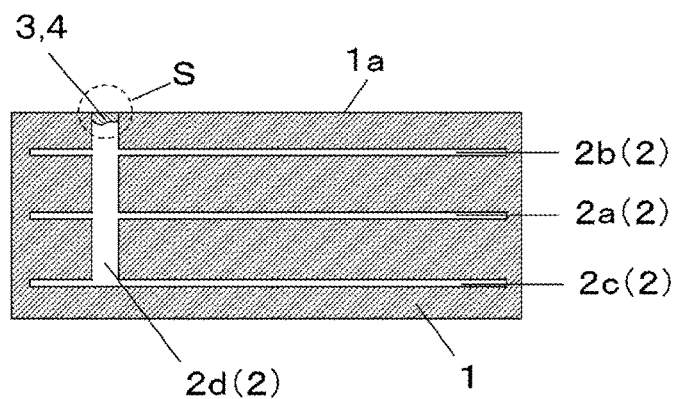
FIG. 3 is a cross-sectional view along line B-B' in FIG. 1.

As illustrated in FIG. 1 to FIG. 3, a ceramic structural body 10 according to the present disclosure includes a substrate 1, a hole 2 that is opened on a surface of the substrate 1, and a seal material 3 that is positioned at an opening portion of the hole 2.

Herein, the substrate 1 is composed of a ceramic(s). A ceramic(s) is/are an aluminum-oxide-based ceramic (s), a zirconium-oxide-based ceramic (s), a silicon-nitride-based ceramic (s), an aluminum-nitride-based ceramic(s), a silicon-carbide-based ceramic (s), a cordierite-based ceramic(s), a mullite-based ceramic (s), or the like.

Then, for example, an aluminum-oxide-based ceramic(s) contain (s) 70% by mass or more of aluminum oxide among 100% by mass of all components that compose such a ceramic(s). Additionally, another ceramic/other ceramics is/are also similar thereto.

Furthermore, it is possible to confirm a material of the substrate 1 by an undermentioned method. First, the substrate 1 is measured by using an X-ray diffractometer (XRD) and a value of an obtained $2\theta$ (where $2\theta$ is a diffraction angle) is identified by a JCPDS card. Herein, a case where presence of aluminum oxide in a substrate is confirmed by an XRD will be explained by providing it as an example. Then, quantitative analysis of aluminum (Al) is executed by using an ICP emission spectrophotometer (ICP) or an X-ray fluorescence spectrometer (XRF). Then, if a content of aluminum oxide ($Al_2O_3$) that is converted from a content of aluminum (Al) that is measured by an ICP or an XRF is 70% by mass or more, the substrate 1 is composed of an aluminum-oxide-based ceramic (s).

Additionally, although FIG. 1 illustrates an example where a shape of the substrate 1 is a circularly cylindrical shape, the shape of the substrate 1 is not limited thereto and any shape is possible.

Furthermore, the hole 2 is to discharge a binder of the substrate 1 to an outside in a degreasing step. Herein, although a shape of the hole 2 may be any shape, it may have a grid-like part as illustrated in FIG. 2 from the viewpoint of discharging a binder to an outside efficiently.

Furthermore, the hole 2 may be positioned at a whole inside of the substrate 1 in such a manner that there is no problem in a strength of the ceramic structural body 10. For example, FIG. 3 illustrates an example where the hole 2 is composed of a hole 2a, a hole 2b, and a hole 2c that extend in a direction that is orthogonal to a thickness direction of the substrate 1, at intervals in the thickness direction of the substrate 1, and a hole 2d that connects the holes 2a to 2c.

Herein, a width of a grid-like part in the hole 2 is, for example, 0.1 mm or greater and 1.0 mm or less. Furthermore, a maximum width of an opening portion that is sealed by the seal material 3 in the hole 2 is, for example, 0.1 mm or greater and 20 mm or less. Additionally, although FIG. 1 and FIG. 3 illustrate an example where an opening portion is of a circularly cylindrical shape, this is not limiting and any shape is possible.

Figure 4:
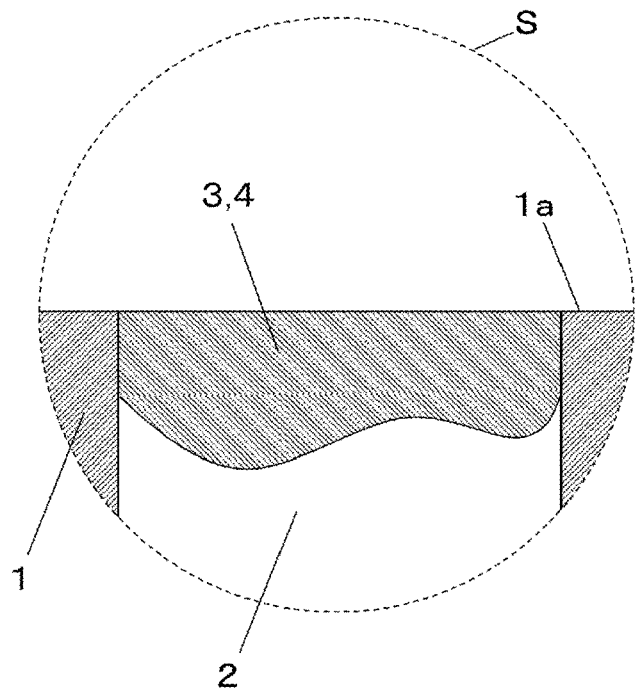
FIG. 4 is an enlarged view of an example of an embodiment of an S part in FIG. 3.

Then, as illustrated in FIG. 4, a seal material 3 in a ceramic structural body 10 according to the present disclosure has a first member 4. Herein, the first member 4 contains at least one of a resin and a metal particle (s) where a total content of the resin and the metal particle (s) is 70% by mass or more among 100% by mass of all components that compose the first member 4. FIG. 4 illustrates an example where the seal material 3 is composed of only the first member 4.

As such a configuration is satisfied, an opening portion of a hole 2 is sealed by the seal material 3 that has the first member 4 and the first member 4 is composed of a component that is solidified by heat treatment at a low temperature (300° C. or lower), so that, in the ceramic structural body 10 according to the present disclosure, a particle (s) is/are not generated from the opening portion and an amount of deformation at a time of sealing is small.

Furthermore, a resin that composes the first member 4 is, for example, an epoxy resin, a cyanate resin, an acryl resin, a maleimide resin, or the like.

Furthermore, a metal particle(s) that compose (s) the first member 4 is/are, for example, a particle (s) that is/are composed of a metal such as nickel, copper, gold, silver, ruthenium, rhodium, palladium, osmium, iridium, or platinum.

Furthermore, the first member 4 may also contain, for example, a ceramic particle (s) or the like, other than a resin or a metal particle (s).

Furthermore, it is sufficient that each component that composes the first member 4 and a content thereof are measured by an undermentioned method. First, the first member 4 is scraped or the like and a resin that is included in the first member 4 is identified by using a Fourier transform infrared spectrophotometer (FTIR). Then, the ceramic structural body 10 is cut so as to provide a cross section as illustrated in FIG. 3, and polishing thereof is executed by using a cross section polisher (CP) so as to obtain a polished surface. Then, it is sufficient that, while such a polished surface is provided as an observation surface, each of contents of a resin and a metal component that compose the first member 4 is calculated by using an energy dispersive X-ray analyzer (EDS) equipped with a scanning electron microscope (SEM).

Figure 5:
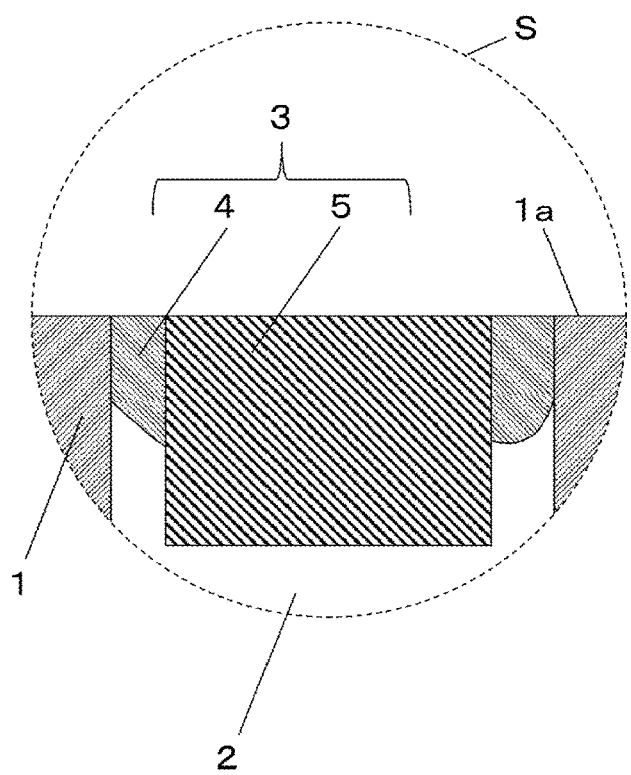
FIG. 5 is an enlarged view of an example of an embodiment of an S part in FIG. 3.

Furthermore, as illustrated in FIG. 5, a seal material 3 in a ceramic structural body 10 according to the present disclosure may have a second member 5 where a first member 4 is positioned at, at least, a part between a wall surface of a hole 2 and the second member 5. Herein, the second member 5 is composed of a ceramic(s) or a metal.

If such a configuration is satisfied, it is possible to seal an opening portion of the hole 2 more tightly than a case where the seal material 3 is composed of only the first member 4, so that, in the ceramic structural body 10 according to the present disclosure, a possibility of generating a particle (s) from the opening portion is low over a long period of use and reliability is improved.

Herein, if the second member 5 is composed of a ceramic (s), a substrate 1 and the second member 5 may be composed of an identical ceramic(s). Herein, the substrate 1 and the second member 5 that are composed of a ceramic (s) refer to, for example, the second member 5 that is also composed of an aluminum-oxide-based ceramic (s) in a case where the substrate 1 is composed of an aluminum-oxide-based ceramic (s). Then, if such a configuration is satisfied, thermal expansion coefficients of the substrate 1 and the second member 5 are identical and a possibility of generating a crack on the seal material 3 due to a difference between the thermal expansion coefficients is low, so that reliability under an environment with a temperature change is improved.

Furthermore, if the second member 5 is composed of a metal, the second member 5 may be a bush that has a hole that is capable of coupling with another member. If such a configuration is satisfied, it is possible to couple the ceramic structural body 10 with another member via the second member 5. Additionally, a metal that composes the second member 5 is, for example, a stainless one, titanium, or the like.

Figure 6:
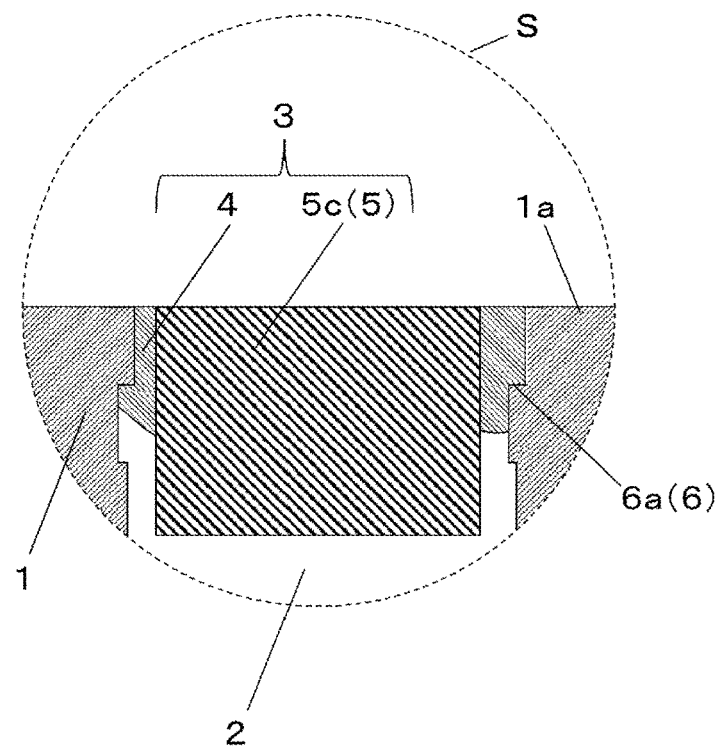
FIG. 6 is an enlarged view of an example of an embodiment of an S part in FIG. 3.
Figure 7:
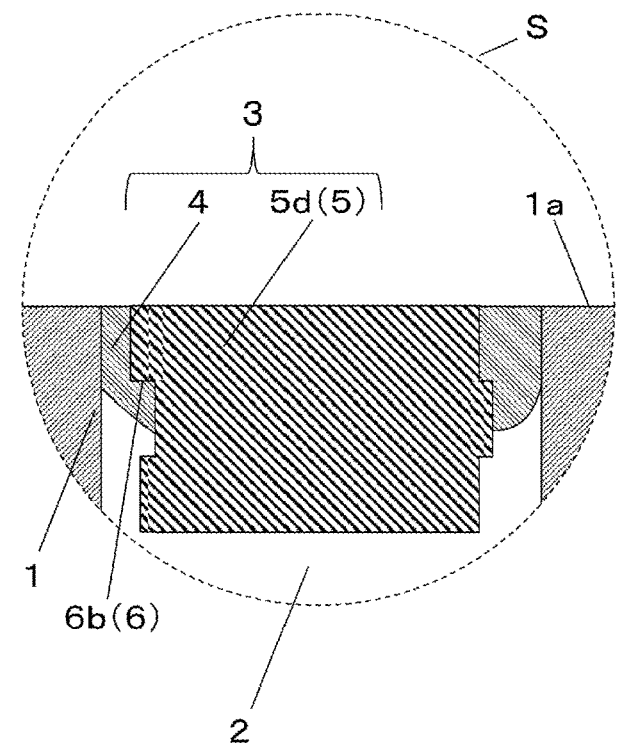
FIG. 7 is an enlarged view of an example of an embodiment of an S part in FIG. 3.

Furthermore, as illustrated in FIG. 6 and FIG. 7, a second member 5 in a ceramic structural body 10 according to the present disclosure may be a columnar body where at least one of a surface that faces the second member 5 on a wall surface of a hole 2 and a surface that faces the wall surface of the hole 2 on the second member 5 has a step 6 in an axial direction of the columnar body.

Herein, FIG. 6 illustrates an example where a surface that faces a second member 5c on a wall surface of the hole 2 has a step 6a in an axial direction of a columnar body. FIG. 7 illustrates an example where a surface that faces a wall surface of the hole 2 on a second member 5d has a step 6b in an axial direction of a columnar body. Additionally, as illustrated in FIG. 6 and FIG. 7, having a step 6 in an axial direction of a columnar body refers to having an irregularity/irregularities on at least one of a surface that faces the second member 5 on a wall surface of the hole 2 and a surface that faces the wall surface of the hole 2 on the second member 5, in a cut surface that is provided by cutting the ceramic structural body 10 in the axial direction of the columnar body.

Then, if such a configuration is satisfied, a contact surface area for a first member 4 is increased by presence of the step 6, so that an opening portion of the hole 2 is sealed more tightly, and in the ceramic structural body 10 according to the present disclosure, a possibility of generating a particle (s) from the opening portion is low over a long period of use, so that reliability is improved.

Figure 8:
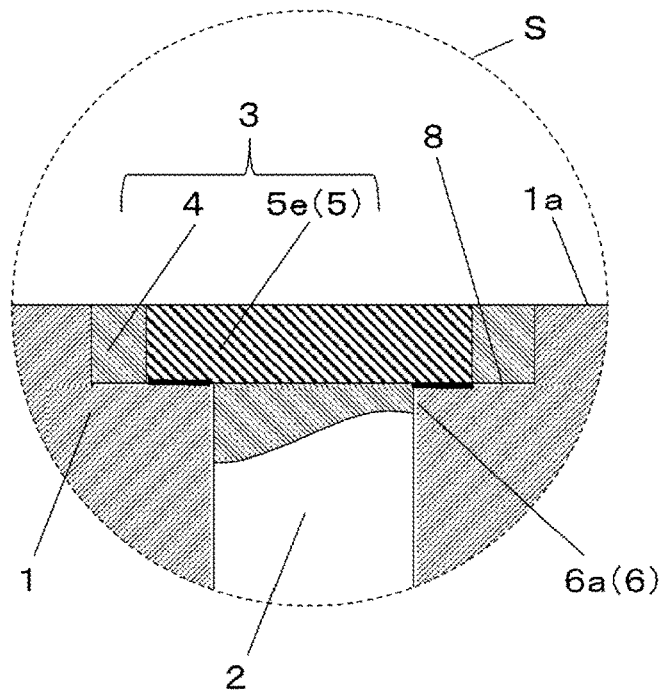
FIG. 8 is an enlarged view of an example of an embodiment of an S part in FIG. 3.

Furthermore, as illustrated in FIG. 8, a second member 5 in a ceramic structural body 10 according to the present disclosure may be a columnar body and have a part where a point of contact with a substrate 1 is provided to circle on an opposite surface for the substrate 1. Herein, an opposite surface for the substrate 1 refers to a surface that faces the substrate 1, on a surface of the second member 5, as indicated by a thick line in FIG. 8.

As illustrated in FIG. 8, a hole 2 may have a portion with a large inner diameter and a portion with a small inner diameter. A second member 5e may be positioned at a portion with a large inner diameter of the hole 2. The hole 2 may have a first surface 8 that is positioned between a portion with a large inner diameter and a portion with a small inner diameter of the hole 2. The second member 5e may be positioned so as to face the first surface 8. For example, the second member 5e may be positioned so as to contact the first surface 8.

Then, if such a configuration is satisfied, an opening portion of the hole 2 is sealed by the second member 5, and in the ceramic structural body 10 according to the present disclosure, a possibility of generating a particle (s) from the opening portion is low over a long period of use, so that reliability is improved.

Figure 9:
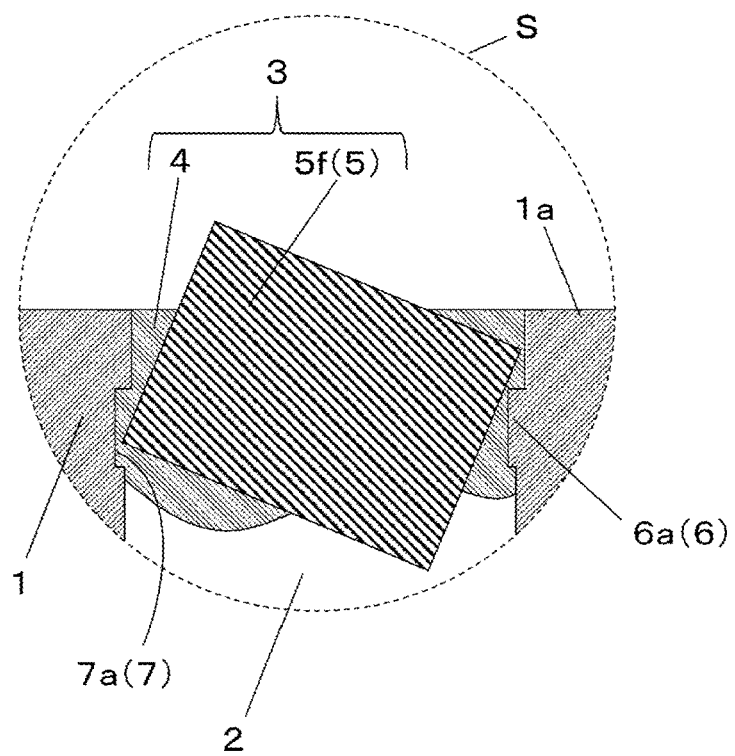
FIG. 9 is an enlarged view of an example of an embodiment of an S part in FIG. 3.

As illustrated in FIG. 9, a corner part of a second member 5f may be positioned at a recess 7a on a wall surface of a hole 2. In a case where it has such a configuration, the second member 5f is readily fixed on a wall surface of the hole 2. Hence, a ceramic structural body 10 has high reliability.

Additionally, a part of the second member 5f may be positioned outside a surface 1a of a substrate. Furthermore, it is assumed that an imaginary plane that is positioned on a plane that is identical to the surface 1a of a substrate is positioned above the hole 2. A part of the second member 5f may be positioned so as to be more distant from the hole 2 than an imaginary plane. Furthermore, the whole of the second member 5f may be positioned in the hole 2. Furthermore, an end part of the second member 5f may be positioned on a plane that is identical to an imaginary plane.

Figure 10:
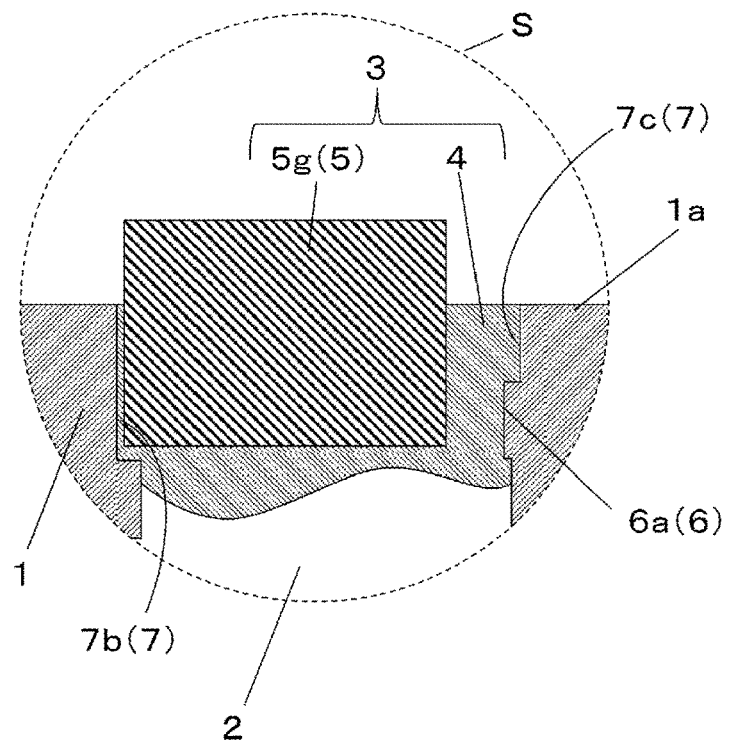
FIG. 10 is an enlarged view of an example of an embodiment of an S part in FIG. 3.

As illustrated in FIG. 10, a ceramic structural body 10 may have a recess 7b on a wall surface of a hole 2. Furthermore, the ceramic structural body 10 may have a recess 7c at a part that faces the recess 7b on a wall surface of the hole 2. The recess 7b may be larger than the recess 7c. For example, a length of the recess 7b in an axial direction of a columnar body may be greater than a length of the recess 7c in the axial direction of the columnar body. In a case where it has such a configuration, a second member 5g is readily fixed at the recess 7b. Hence, the ceramic structural body 10 has high reliability.

Additionally, a part of the second member 5g may be positioned outside a surface 1a of a substrate. Furthermore, it is assumed that an imaginary plane that is positioned on a plane that is identical to the surface 1a of a substrate is positioned above the hole 2. A part of the second member 5g may be positioned so as to be more distant from the hole 2 than an imaginary plane. Furthermore, the whole of the second member 5g may be positioned in the hole 2. Furthermore, an end part of the second member 5g may be positioned on a plane that is identical to an imaginary plane.

Figure 11:
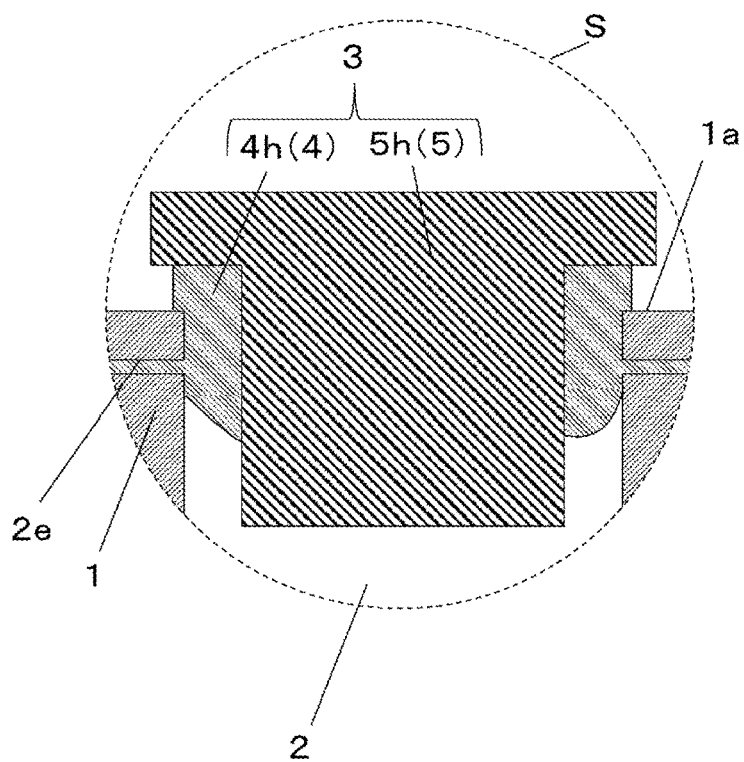
FIG. 11 is an enlarged view of an example of an embodiment of an S part in FIG. 3.

As illustrated in FIG. 11, a second member 5h may have a part that has a diameter that is greater than an inner diameter of a hole 2. For example, the second member 5h may have a part that has a diameter that is greater than an inner diameter of the hole 2 at an end part in an axial direction of a columnar body. Furthermore, a part that has a diameter that is greater than an inner diameter of the hole 2 may be positioned outside a substrate 1. Furthermore, the second member 5h may have a part with a diameter that is less than an inner diameter of the hole 2. Furthermore, a first member 4h may be positioned between a part that has a diameter that is greater than an inner diameter of the hole 2 on the second member 5h and a surface 1a of a substrate. Furthermore, the first member 4h may be positioned among a part that has a diameter that is greater than an inner diameter of the hole 2 on the second member 5h, a part with a diameter that is less than the inner diameter of the hole 2 on the second member 5h, the surface 1a of a substrate, and a wall surface of the hole 2. In a case where it has such a configuration, a surface area where the first member 4h contacts the second member 5h is large. Hence, the first member 4h and the second member 5h are readily fixed. Therefore, a ceramic structural body 10 has high reliability.

Furthermore, as illustrated in FIG. 11, the hole 2 may have a hole 2e that extends in a direction that is parallel to the surface 1a of a substrate. The first member 4h may be positioned at the hole 2e. In a case where it has such a configuration, the first member 4h is readily fixed at the hole 2 and the hole 2e. Hence, the second member 5h is readily fixed at the hole 2. Therefore, the ceramic structural body 10 has high reliability.

Figure 12:
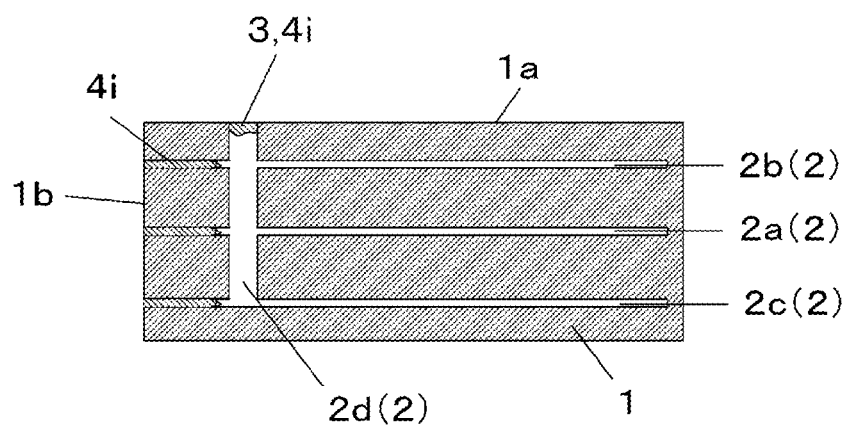
FIG. 12 is an example of an embodiment in FIG. 3.

As illustrated in FIG. 12, a substrate 1 may have a hole 2a, a hole 2b, and a hole 2c that extend in a direction that is orthogonal to a thickness direction of the substrate 1, at intervals in the thickness direction of the substrate 1. Furthermore, a hole 2 may have a hole 2d that connects the holes 2a to 2c. The hole 2a, the hole 2b, and the hole 2c may be opened on a surface 1b of a substrate. A first member 4i may be positioned at an opening portion of the hole 2a that is opened against the surface 1b of a substrate. In a case where it has such a configuration, it is possible for the first member 4i to seal an opening portion of the hole 2 tightly.

Figure 13:
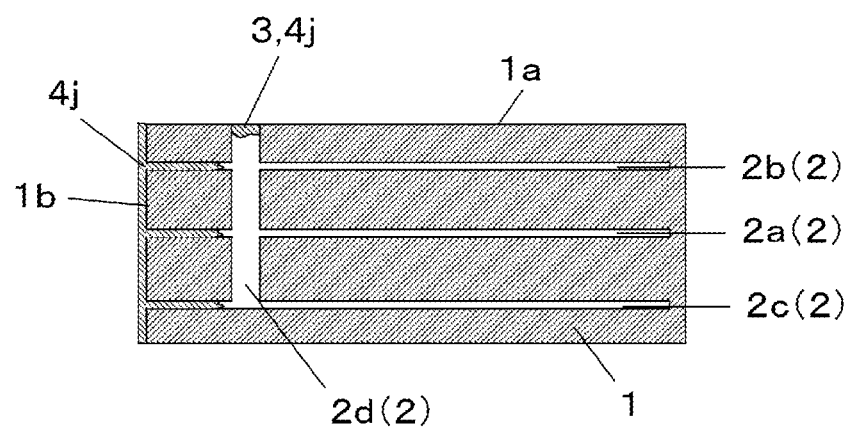
FIG. 13 is an example of an embodiment in FIG. 3.

As illustrated in FIG. 13, a first member 4j may be positioned at an opening portion of a hole 2a that is opened against a surface 1b of a substrate. Furthermore, the first member 4j may be positioned at the surface 1b of a substrate. In a case where it has such a configuration, it is possible for the first member 4j to seal an opening portion of a hole 2 tightly.

Furthermore, a hole 2 in a ceramic structural body 10 according to the present disclosure may have a gas with a gas pressure that is less than an atmospheric pressure. If such a configuration is satisfied, the hole 2 serves as a heat insulation layer, so that it is possible to utilize the ceramic structural body 10 as a heat insulation material preferably.

Furthermore, a substrate 1 in a ceramic structural body 10 according to the present disclosure may have a flow path, an electrode, or the like, at a part other than a hole 2. If such a configuration is satisfied, it is possible to utilize the ceramic structural body 10 as a component of a heat exchanger, a reactor, or the like. Hereinafter, an example of a manufacturing method for a ceramic structural body according to the present disclosure will be explained.

First, predetermined amounts of a sintering aid, a binder, a solvent, a dispersant, and the like are added to, and mixed with, a raw material powder such as an aluminum oxide ($Al_2O_3$) powder, a silicon nitride ($Si_3N_4$) powder, an aluminum nitride (AlN) powder, or a silicon carbide (SiC) powder, so as to fabricate a slurry.

Then, a green sheet is formed by using such a slurry in a doctor blade method. Alternatively, a slurry is sprayed and dried by a spray granulation method (a spray drying method) so as to execute granulation and a green sheet is formed by a roll compaction method.

Then, processing is executed for an obtained green sheet by using a publicly known method such as laser and a mold so as to provide a desired shape. Herein, a groove for degreasing is formed on a green sheet.

Then, both green sheets are laminated by a lamination method so as to obtain a molded body. Herein, if lamination is executed in such a manner that positions of both grooves of adjacent green sheets are shifted, it is possible to form a step on a surface that faces a second member in a substrate.

Additionally, a slurry as described above may be used as a bonding material that is used at the time when green sheets are laminated.

Then, after an obtained molded body is dried and degreased, firing is executed in accordance with a firing condition(s) for each raw material powder so as to obtain a substrate.

Then, a site that is connected to an outside of a groove on a substrate is filled with a paste that provides a first member and contains at least one of a resin and a metal particle(s) where a total content of the resin and the metal particle (s) is 70% by mass or more. Alternatively, after a second member that is composed of a ceramic(s) or a metal is inserted into a site that is connected to an outside of a groove on a substrate, a space between the second member and the groove is filled with a paste that provides a first member.

Then, heat treatment is executed at a temperature of 80° C. or higher and 300° C. or lower, so as to obtain a ceramic structural body according to the present disclosure.

Furthermore, in order to provide a groove that has a gas with a gas pressure that is less than an atmospheric pressure, it is sufficient that a substrate is heated to 100° C. or higher and a gas that is present in a groove is discharged to an outside of the substrate, at a step of sealing a site that is connected to an outside of the groove as described above. Alternatively, it is sufficient that a step of sealing a site that is connected to an outside of the groove as described above is executed in a glove box that is filled with a gas with a gas pressure that is less than an atmospheric pressure.

Additionally, the present disclosure is not limited to an embodiment (s) as described above and a variety of modifications, improvements, and the like are possible without departing from an essence of the present disclosure.

REFERENCE SIGNS LIST

1: substrate
1a, 1b: surface of substrate
2: hole
3: seal material
4: first member
5: second member
6: step
7: recess
8: first surface
10: ceramic structural body

The invention claimed is:

1. A ceramic structural body, comprising:
a substrate that is composed of a ceramic(s);
a hole that is opened on a surface of the substrate; and
a seal material that is positioned at an opening portion of the hole,
wherein
the seal material includes a first member that contains at least one of a resin, a metal particle(s), and a ceramic particle(s),
the seal material includes a second member that is composed of a ceramic(s) or a metal,
the first member is positioned at, at least, a part between a wall surface of the hole and the second member,
the second member is a columnar body,
a first section of the wall surface includes a recess and a second section of the wall surface that opposes the first section includes a protrusion located at a depth corresponding to a depth of the recess.

2. The ceramic structural body according to claim 1, wherein
the hole includes a gas with a gas pressure that is less than an atmospheric pressure.

3. A ceramic structural body, comprising:
a substrate that is composed of a ceramic(s);
a hole that is opened on a surface of the substrate; and
a seal material that is positioned at an opening portion of the hole,
wherein
the seal material includes a first member that contains at least one of a resin, a metal particle(s), and a ceramic particle(s),
the seal material includes a second member that is composed of a ceramic(s) or a metal,
the first member is positioned at, at least, a part between a wall surface of the hole and the second member,
the second member is a columnar body,
a first section of the second member includes a recess and a second section of the second member that opposes the first section includes a protrusion located at a depth corresponding to a depth of the recess.

4. The ceramic structural body according to claim 3, wherein
the hole includes a gas with a gas pressure that is less than an atmospheric pressure.

* * * * *